United States Patent
Yamada

(10) Patent No.: US 8,942,212 B2
(45) Date of Patent: Jan. 27, 2015

(54) AUTOCONFIGURATION SYSTEM FOR WIRELESS SENSOR NETWORK AND ITS METHOD, AND GATEWAY APPARATUS FOR WIRELESS SENSOR NETWORK

(75) Inventor: Katsuhiko Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 411 days.

(21) Appl. No.: 12/622,051

(22) Filed: Nov. 19, 2009

(65) Prior Publication Data

US 2010/0080206 A1 Apr. 1, 2010

Related U.S. Application Data

(63) Continuation-in-part of application No. 12/526,235, filed as application No. PCT/JP2008/052719 on Feb. 19, 2008, now abandoned.

(30) Foreign Application Priority Data

Feb. 19, 2007 (JP) .................................. 2007-038024

(51) Int. Cl.
*H04W 4/00* (2009.01)
*H04W 48/14* (2009.01)
(Continued)

(52) U.S. Cl.
CPC .............. *H04W 48/14* (2013.01); *H04W 40/24* (2013.01); *H04W 80/04* (2013.01)
USPC ........... 370/338; 370/310; 370/228; 709/220; 709/221; 709/222

(58) Field of Classification Search
None
See application file for complete search history.

(56) References Cited

U.S. PATENT DOCUMENTS

2001/0017856 A1* 8/2001 Asokan et al. ................ 370/389
2005/0249131 A1* 11/2005 Takahashi et al. ............ 370/254
(Continued)

FOREIGN PATENT DOCUMENTS

JP 2005204016 A 7/2005
JP 21006050321 A 2/2006
(Continued)

OTHER PUBLICATIONS

K. Mayer et al., "IP-enabled Wireless Sensor Networks and their integration into the Internet", [online], ACM International Conference Proceeding Series; vol. 138, Proceedings of the first International conference on Integrated internet ad hoc and sensor networks, ACM, May 31, 2006, <URL:http://portal.acm.org/citation.cfm?id=1142687>>.

*Primary Examiner* — Marcus R Smith
*Assistant Examiner* — Gautam Sharma
(74) *Attorney, Agent, or Firm* — Sughrue Mion, PLLC

(57) ABSTRACT

The present invention enables connection between a wireless sensor node and a service server while reducing load on the wireless sensor node.

The wireless sensor node transmits a router solicitation message to a gateway apparatus; the gateway apparatus analyzes the message to extract the discrete information of a device or service, searches for a service server based on such information and acquires the configuration information necessary for execution of a service application of the wireless sensor node; the gateway apparatus multicasts the received router solicitation message into a link; a router within the link receives the router solicitation message, and multicast a router advertisement message which contains the prefix information of an address, etc. into a link; the gateway apparatus sets the acquired configuration information in the router advertisement message and transfers the resultant message to the wireless sensor node; and the wireless sensor node analyzes the message.

5 Claims, 3 Drawing Sheets

(51) Int. Cl.
 *H04W 40/24* (2009.01)
 *H04W 80/04* (2009.01)

(56) References Cited

U.S. PATENT DOCUMENTS

| | | | |
|---|---|---|---|
| 2006/0153111 A1* | 7/2006 | Roh et al. | 370/310 |
| 2006/0248230 A1* | 11/2006 | Kempf et al. | 709/245 |
| 2007/0274250 A1* | 11/2007 | Chen et al. | 370/328 |
| 2008/0107067 A1* | 5/2008 | Baek et al. | 370/328 |
| 2008/0137591 A1* | 6/2008 | Hirano et al. | 370/328 |
| 2009/0161581 A1* | 6/2009 | Kim | 370/254 |
| 2010/0269155 A1* | 10/2010 | Droms et al. | 726/3 |

FOREIGN PATENT DOCUMENTS

| | | |
|---|---|---|
| JP | 2006148241 A | 6/2006 |
| JP | 2006238300 A | 9/2006 |

* cited by examiner

AUTOCONFIGURATION SYSTEM FOR WIRELESS SENSOR NETWORK AND ITS METHOD, AND GATEWAY APPARATUS FOR WIRELESS SENSOR NETWORK

INCORPORATION BY REFERENCE

This is a continuation-in-part of U.S. patent application Ser. No. 12/526,235 filed Aug. 6, 2009 now abandoned and claims the benefit of its priority.

TECHNICAL FIELD

The present invention relates to an autoconfiguration system for a wireless sensor network and its method, which enable connection between a wireless sensor node and a service server.

BACKGROUND ART

The use of wireless sensor networks has been expanding rapidly in recent years, fueled by the progress of the standardization of communication technologies for wireless sensor networks, such as IEEE802.15.4 and Zigbee. In the past, it was difficult to realize services for wireless sensor nodes that require interoperation with external networks. This was because the realization of such services involves stringent constraints with respect to the resources and communication functions of nodes such as memory size, CPU performance, and communication with sleep function. However, as device implementation technologies and network technologies for wireless sensor nodes see significant advancement, the development of technologies for enabling interoperation between a wireless sensor network and an external network is becoming increasingly active. For example, through efforts like IETF 6 lowpan, the development and standardization of enabling technologies for IPv6 networking functions over the MAC layer protocol of IEEE802.15.4 are being promoted.

These enabling technologies for IPv6 networking functions are disclosed in, for example, Patent Literatures 1 to 3 listed below:

Patent Literature 1: Japanese Patent Laying-Open No. 2005-204016
Patent Literature 2: Japanese Patent Laying-Open No. 2006-148241
Patent Literature 3: Japanese Patent Laying-Open No. 2006-238300

When promoting the realization of large-scale and practical ubiquitous services for homes and businesses, issues that must be addressed are: (i) reduction of administrative load involved in the operation of a wireless sensor network and (ii) enabling of outsourcing of various services. As efforts are made to solve these issues, increased importance would be given to functions to perform runtime configuration on wireless sensor nodes remotely from a service server and those to enable a wireless sensor node and a service server to communicate with each other.

These functions can be realized by incorporating IPv6 into a wireless sensor network, because, an IPv6ed wireless sensor node is able to communicate directly with a remote service server.

However, considering the case that a wireless sensor node can move freely among service domains and change the service server to communicate, it is generally difficult for the node to previously have the addresses or other information of service servers that is necessary to connect to them. In order for the service server to perform runtime configuration on a wireless sensor node, the wireless sensor node is required to perform several processes after completing the connection process to connect to a wireless sensor network at the MAC layer and therebelow. These include the processes of: configuring settings for connection, such as determining an IP address with which to utilize the IPv6 networking functions; acquiring the service server's connection information and connecting to the service server; and acquiring configuration information from the service server and reflecting the acquired configuration information.

These processes, if performed directly by individual wireless sensor nodes separately, will lead to an increase in the number of wireless communications performed by each wireless sensor node and its operation time. Such increase will hinder the efforts being made to reduce power consumption by a wireless sensor node by way of reducing the operation time and the number of wireless communications. It is, therefore, necessary to realize an efficient processing scheme for such processes.

An object of the present invention is to provide an autoconfiguration system for a wireless sensor network and its method and a gateway apparatus for a wireless sensor network, which enable connection between a wireless sensor node and a service server while reducing load on the wireless sensor node.

SUMMARY

In the present invention, a gateway apparatus, which has a function to search for a service server based on the discrete information of a service or device and which provides a function to connect between a wireless sensor network and a wired network via IPv6, is added a function to analyze IPv6 router solicitation messages and router advertisement messages; acquire necessary configuration information from the service server; and set configuration information in the router advertisement message. In addition, the wireless sensor node is added a function to read out from a router advertisement message the configuration information set by the gateway apparatus and to provide such information to a service application.

According to a first exemplary aspect of the invention, an autoconfiguration method for a wireless sensor network, comprising the steps of, by a wireless sensor node connected to the wireless sensor network, transmitting a router solicitation message in order to set an IPv6 address in a IPv6 network, etc., by a gateway apparatus, extracting discrete information of a device or service from the received router solicitation message, searching for a service server based on the discrete information, and acquiring configuration information necessary for execution of a service application in the wireless sensor node, by the gateway apparatus, transferring the configuration information to the wireless sensor node, and by the wireless sensor node, providing the received configuration information to the service application.

According to a second exemplary aspect of the invention, an autoconfiguration system for a wireless sensor network, comprises a wireless sensor node connected to the wireless sensor network comprising a unit to transmit a router solicitation message in order to set an IPv6 address in a IPv6 network, etc., a gateway apparatus comprising a unit to extract discrete information of a device or service from the received router solicitation message, search for a service server based on the discrete information and acquire configuration information necessary for execution of a service application in the wireless sensor node, and a unit to transfer the acquired configuration information to the wireless sensor node, and the wireless sensor node comprising a unit to provide the received configuration information to the service application.

According to a third exemplary aspect of the invention, a gateway apparatus for a wireless sensor network, comprises a unit to receive a router solicitation message from a wireless sensor node connected to the wireless sensor network in order to set an IPv6 address in an IPv6 network, etc., extract from the received router solicitation message discrete information of a device or service, search for a service server based on the discrete information, and acquire configuration information necessary for execution of a service application in the wireless sensor node, and a unit to transfer the acquired configuration information to the wireless sensor node.

According to the present invention, in an IPv6ed wireless sensor network, functions are provided which enable application runtime configuration on a wireless sensor node from a remote service server, as well as communication between a wireless sensor node and a service server.

EXEMPLARY EMBODIMENT

Figure 1:
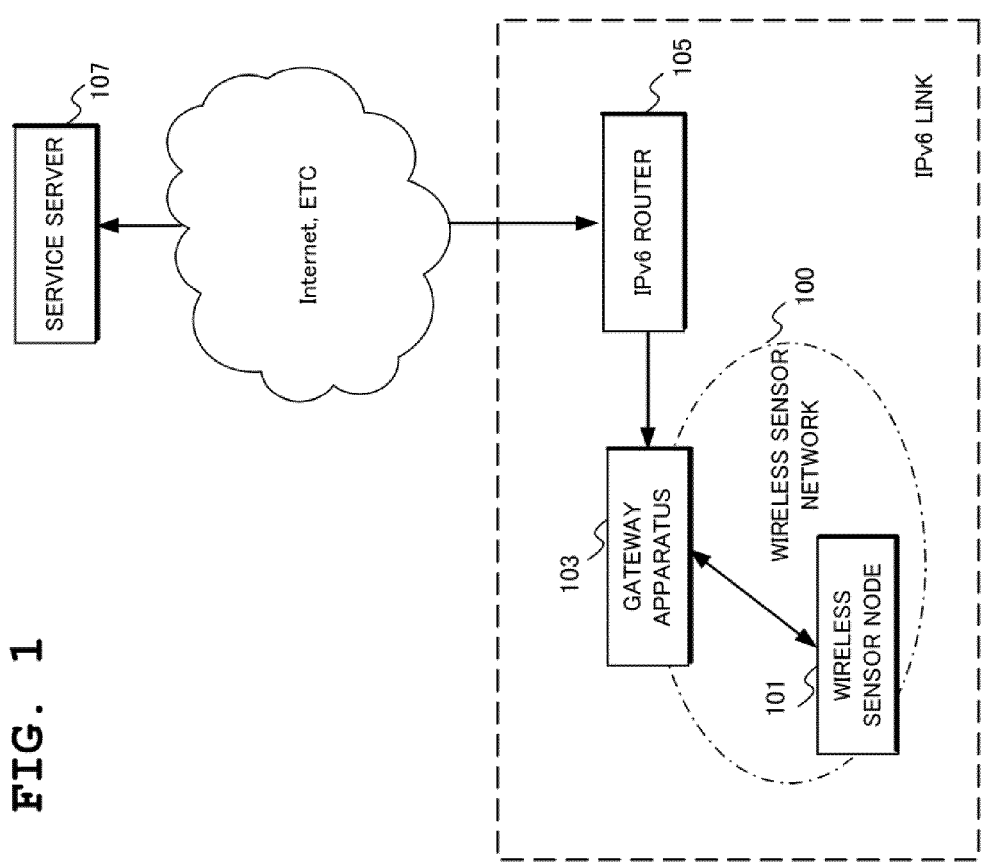
FIG. 1 is a block diagram showing the general structure of an autoconfiguration system for a wireless sensor network according to an exemplary embodiment of the present invention.

For use in a wireless sensor network which consists of wireless sensor nodes incorporating IPv6 networking functions, the present invention provides functions to utilize the IPv6 autoconfiguration function to perform application runtime configuration on a wireless sensor node from a remote service server automatically and efficiently.

The most preferred embodiment of the present invention will now be described in detail by referring to the drawings.

FIG. 1 shows a system structure according to the exemplary embodiment of the present invention. The system according to this exemplary embodiment comprises a wireless sensor node 101, a gateway apparatus 103, an IPv6 router 105 and a service server 107.

Figure 2:
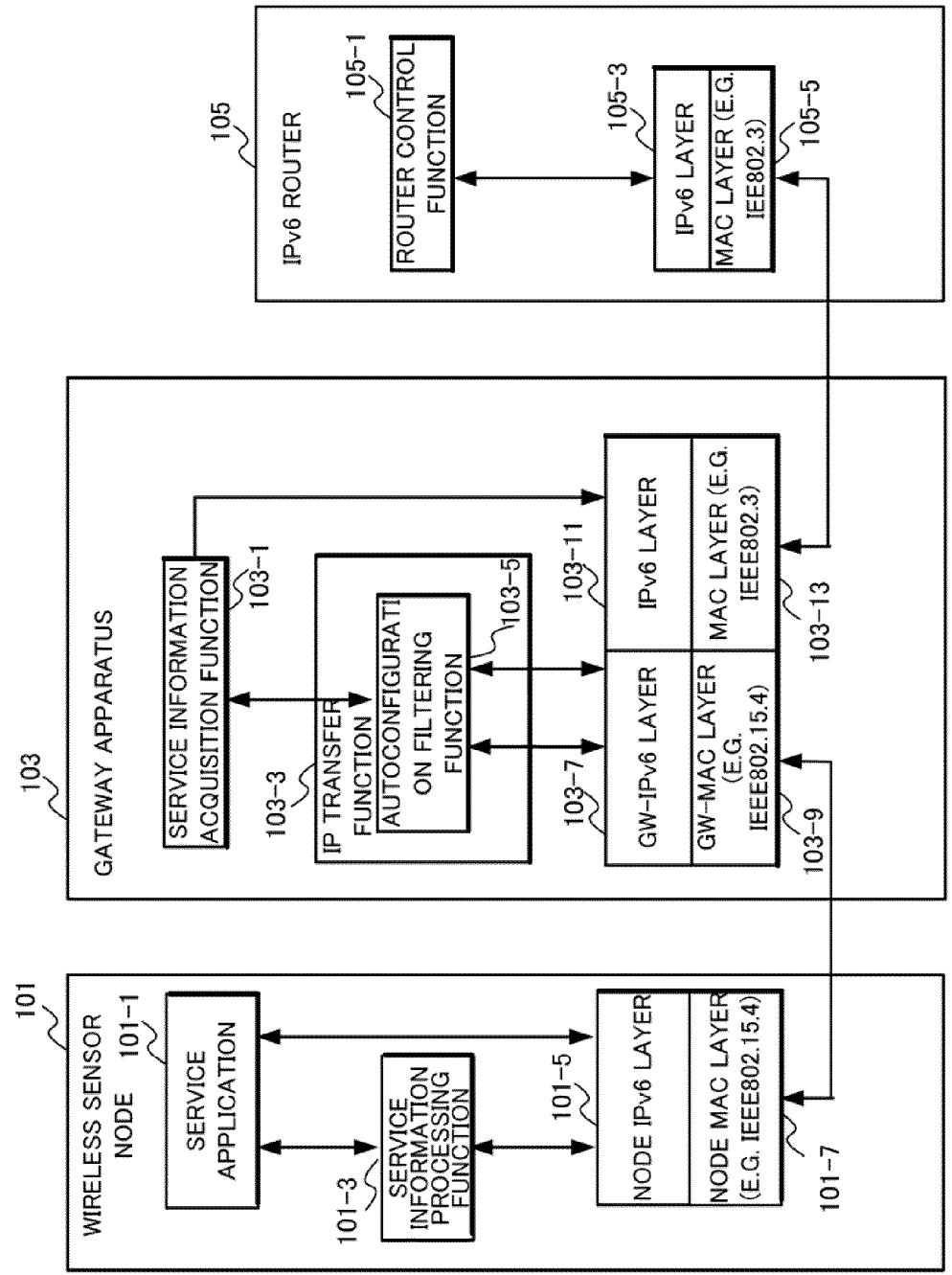
FIG. 2 is a block diagram showing the structures of a wireless sensor node, a gateway apparatus and an IPv6 router according to the exemplary embodiment of the present invention.

FIG. 2 shows a functional block diagram for the wireless sensor node 101, the gateway apparatus 103 and the IPv6 router 105, by all of which this exemplary embodiment is characterized.

The wireless sensor node 101 has IPv6 networking functions, including a function to perform the processing by executing the router solicitation and router advertisement protocols in order to manage the IPv6 address of own node. In addition, the wireless sensor node 101 has a service information processing function 101-3, which sets the discrete information of a device or service in a router solicitation message; reads the configuration information necessary for executing a service application from the received router advertisement message; and provides such information to the service application 101-1.

Within the wireless sensor node 101, 101-5 is a node IPv6 layer protocol and 101-7 is a node MAC layer protocol.

The gateway apparatus 103 comprises an IP transfer function 103-3, which transfers IPv6 packets between the MAC layer protocol 103-9 of a wireless sensor network 100, such as IEEE802.15.4, and the MAC layer protocol 103-13 of an existing IPv6 network, such as IEEE802.3. The MAC layer protocol of the wireless sensor network 100 differs from IEEE802.3 and other similar network protocols in terms of packet size and communication control function. Therefore, the IPv6 networking functions in the MAC layer of the wireless sensor network that are implemented in the gateway apparatus 103 need to comprise a function to absorb these protocol differences. The schemes to realize these basic functions of the gateway apparatus 103 are beyond the scope of the present invention and therefore are excluded from the description below.

In addition to these basic functions, the gateway apparatus 103 has an autoconfiguration filtering function 103-5, which reads the discrete information of a device or service from the router solicitation message received from the wireless sensor node 101, and sets configuration information for the wireless sensor node 101 in a router advertisement message, which is received from the IPv6 router 105 and is transmitted to the wireless sensor node; and a service information acquisition function 103-1, which searches for a service server to connect to, based on the discrete information of a device or service provided by the wireless sensor node 101, and acquires the configuration information necessary for connection to or execution of a service.

Within the gateway apparatus 103, 103-7 is a GW-IPv6 layer protocol; 103-9 is a GW-MAC layer protocol; 103-11 is an IPv6 layer protocol; and 103-13 is a MAC layer protocol.

The IPv6 router 105 has a router control function 105-1, which receives a router solicitation message, and multicasts a router advertisement message that contains the prefix information of the IPv6 address, etc. into an IPv6 link.

Within the IPv6 router 105, 105-3 is an IPv6 layer protocol, and 105-5 is a MAC layer protocol.

The operation according to the exemplary embodiment of the present invention will be described in detail with reference to FIGS. 2 and 3.

When a connection with the wireless sensor network 100 is established, the wireless sensor node 101 transmits a router solicitation message to the gateway apparatus 103 in order to set the IPv6 address in the IPv6 network, etc. (step S201).

At this time, the wireless sensor node 101 causes the service information processing function 101-3 to insert the discrete information of a device or service within the wireless sensor node 101 into the router solicitation message.

Upon receipt of the router solicitation message, the gateway apparatus 103 causes the autoconfiguration filtering function 103-5 to analyze the message and extract the discrete information of the device or service (step S203).

The gateway apparatus 103 then causes the service information acquisition function 103-1 to search for a service server 107 based on the discrete information, and acquires from the service server 107 the configuration information necessary for the execution of the service application 101-1 within the wireless sensor node 101 (steps S205 and S206).

Following this, the gateway apparatus 103 multicasts the router solicitation message received from the wireless sensor node 101 into an IPv6 link (step S207). The IPv6 router 105 within the IPv6 link receives the router solicitation message and multicasts a router advertisement message, which contains the prefix information of the IPv6 address, etc., into the IPv6 link (step S209).

Upon receipt of the router advertisement message, the gateway apparatus 103 causes the autoconfiguration filtering function 103-5 to set the configuration information acquired from the service server 107 in the router advertisement message (step S211) and transfers it to the wireless sensor node (step S213).

Upon receipt of the router advertisement message transferred from the gateway apparatus 103, the wireless sensor node 101 causes the service information processing function 101-3 to analyze the message to read out the configuration information and provides the information thus read out to the service application 101-5. By this, it becomes possible for the service application 101-5 of the wireless sensor node 101 to operate according to the configuration information provided by the remote service server 107.

If the configuration information includes connection information for the service server 107, such as its IP address, the wireless sensor node 101 can also communicate with the service server directly (step S215).

In the description above, the operation in which the service information acquisition function 103-1 of the gateway apparatus 103 acquires the configuration information may be performed at a different timing, as long as the acquisition is performed before the router advertisement message is transferred to the wireless sensor node 101 (step S213). For example, the acquisition may be performed immediately after the gateway apparatus 103 receives the router advertisement message (step S209) or, instead, the configuration information previously cached within the service information acquisition function 103-1 may be utilized.

The following effects can be obtained by the use of this exemplary embodiment.

(1) By utilizing the router solicitation protocol (step S207) and the router advertisement protocol (step S209) of IPv6 as a means to communicate the configuration information from a service server 107 to a wireless sensor node 101, it becomes unnecessary to provide a special protocol on the service application 101-5 side for acquiring the configuration information when the service server 107 performs service application runtime configuration on the wireless sensor node 101.

(2) An increase in power consumption of a wireless sensor node 101 can be prevented, since other than communication needed for the basic configuration of IPv6, there is no need for communication between a wireless sensor node 101 and a gateway apparatus 103.

(3) It becomes possible for a service server 107 to remotely perform service application runtime configuration on a wireless sensor node 101, simply by installing a gateway apparatus 103, without modifying an existing IPv6 router 105.

Although the present invention has been described in the foregoing with reference to a preferred exemplary embodiment (and examples), the invention is not limited to the configurations and operations of such exemplary embodiment (and examples). Those skilled in the art will appreciate that various modifications to the configurations and details of the invention are possible without departing from the scope and spirit of the invention.

Especially, this invention is independent as a wireless system, and can be applied to the arbitrary wireless systems by which a wireless node performs communication via IPv6.

Even if a node MAC layer of the wireless sensor node and a GW-MAC layer of the gateway apparatus as indicated in FIG. 2 are replaced with a wireless system of wireless broadband networks, such as WiFi, WiMAX, and 3GPP, and a wireless system of other wireless sensor networks, such as Zigbee, the above-mentioned effect can be acquired by the system configuration and operation which were explained in the exemplary embodiment.

Figure 3:
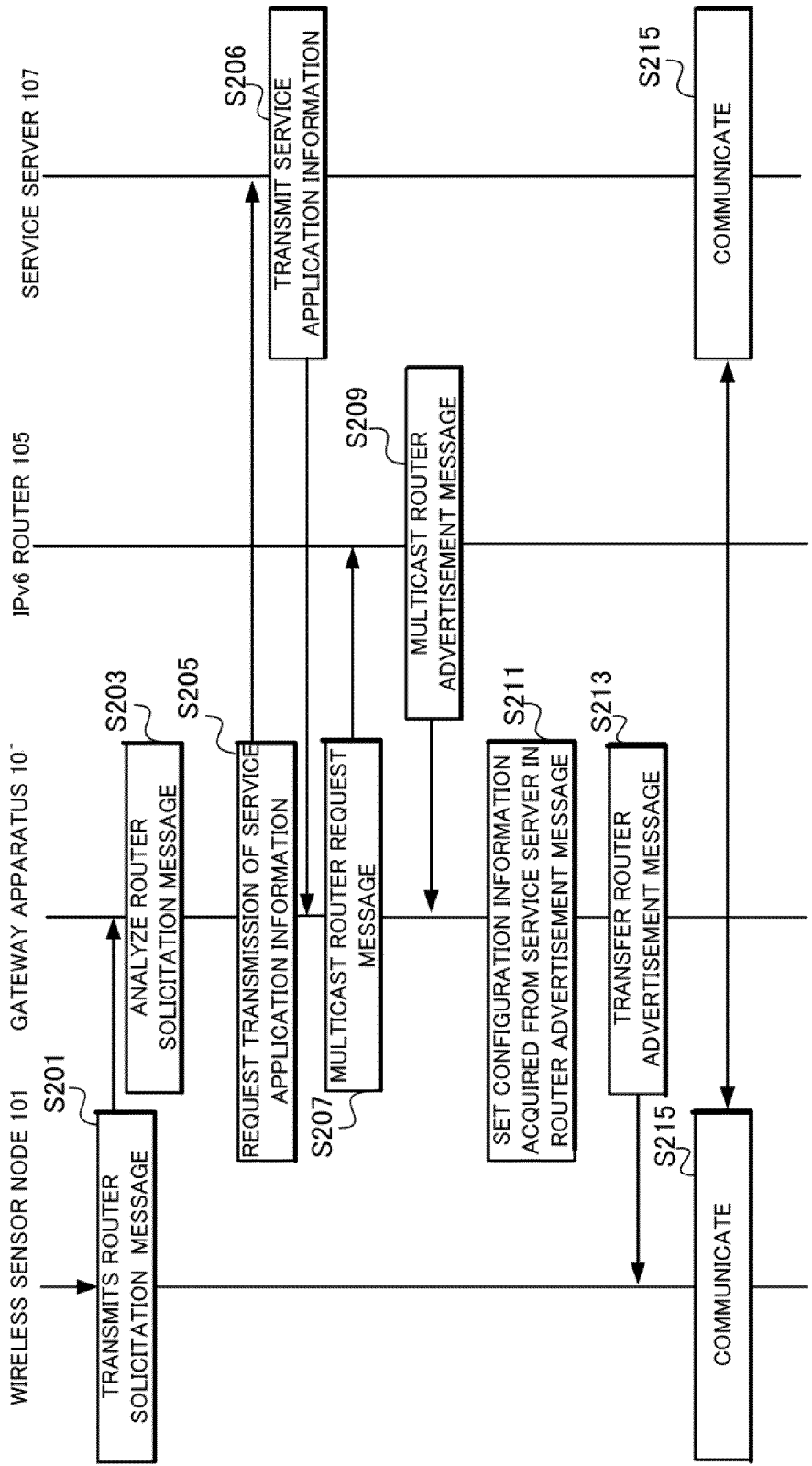
FIG. 3 is a flow chart showing an autoconfiguration method for a wireless sensor network according to the exemplary embodiment of the present invention.

For example, in the case of a WiFi system, even if a wireless sensor node is replaced with a wireless LAN terminal, Gateway apparatus is replaced with a wireless LAN access point, a wireless sensor network is replaced with a wireless LAN network and a node MAC layer and a GW-MAC layer are replaced with IEEE802.11, operation and the effect of this invention are realizable by applying the configuration indicated in FIG. 2, and the flow chart indicated in FIG. 3.

Moreover, in the case of a WiMAX system, even if a wireless sensor node is replaced with a Subscriber Station (SS) or a Mobile Station (MS), a gateway apparatus is replaced with a Base Station (BS), a wireless sensor network is replaced with a WiMAX network and a node MAC layer and a GW-MAC layer are replaced with IEEE802.16 or IEEE802.16e, operation and the effect of this invention are realizable by applying the configuration indicated in FIG. 2, and the flow chart indicated in FIG. 3.

In the case of the wireless system of a wireless broadband network, this invention is effective for service that reduction of power consumption of a wireless node, such as M2M (Machine To Machine) service, is required.

In addition, in a WiMAX system, IP Convergence Sublayer (IPCS) is specified between a MAC layer and an IP layer. However, this IP Convergence Sublayer (IPCS) is a layer which provides a function for absorbing the difference in the data format of a MAC layer and an IP layer, and does not affect operation of this invention. Therefore, this IP Convergence Sublayer (IPCS) could be included in a MAC layer in the configuration indicated in FIG. 2. Also in other wireless systems, Sublayer with the same purpose could be included in a MAC layer.

INCORPORATION BY REFERENCE

This application claims priority on the basis of Japanese Patent Application No. 2007-038024 filed as of Feb. 19, 2007, and incorporates by reference herein the disclosure thereof in its entirety.

INDUSTRIAL APPLICABILITY

The invention has extensive potential applications in wireless sensor network systems operated and managed by service providers. Possible applications include remote medical care and health care, remote state management of buildings and facilities, and state management of retail products that heavily rely on sensor data.

What is claimed is:
1. An autoconfiguration method for a wireless sensor network which includes a plurality of wireless sensor nodes and a gateway apparatus for connecting to an IPv6 network outside the wireless sensor network, said method comprising the steps of:
by a wireless sensor node when connected to the wireless sensor network, transmitting a router solicitation message, with insertion of discrete information, of a device or service within the wireless sensor node, to the gateway apparatus in order to set an IPv6 address in a IPv6 network;
by said gateway apparatus, analyzing said received router solicitation message to extract the discrete information of a device or service, searching for a service server, which is located remotely and connected through the IPv6 network, based on said discrete information, and acquiring from the service server configuration information including information necessary for execution of a service application in said wireless sensor node and connection information necessary for connection with said service server;

by said gateway apparatus, providing IPv6 packet transfer function between a MAC layer protocol used in the wireless sensor network and a MAC layer protocol used in the IPv6 network, and multicasting said router solicitation message received from said wireless sensor node into the IPv6 network, and receiving a router advertisement message which contains prefix information of the IPv6 address in the IPv6 network;

by said gateway apparatus, setting said configuration information acquired from said service server in said router advertisement message upon receipt from the IPv6 network, and transferring said router advertisement message to the wireless sensor node; and by said wireless sensor node, upon receipt of the router advertisement message transferred from said gateway apparatus, analyzing said router advertisement message to read out said configuration information and providing said configuration information to the service application for execution.

2. The autoconfiguration method for the wireless sensor network according to claim 1, wherein, when said configuration information includes connection information for the service server, such as its IP address, said service application in said wireless sensor node directly communicates with said service server.

3. An autoconfiguration system for a wireless sensor network which includes a wireless sensor node of a plurality of wireless sensor nodes, and a gateway apparatus for connecting to an IPv6 network outside the wireless sensor network, said system comprising:

said wireless sensor node being configured:
to transmit a router solicitation message, with insertion of discrete information of a device or service within the wireless sensor node, to the gateway apparatus in order to set an IPv6 address in the IPv6 network when a connection with the wireless sensor network is established, and
to receive a router advertisement message which contains prefix information of the IPv6 address in the IPv6 network transferred from said gateway apparatus; and said gateway apparatus being configured:
to analyze the received router solicitation message to extract the discrete information of a device or service,
to search for a service server, which is located remotely and connected through the IPv6 network, based on said discrete information,
to acquire from the service server configuration information including information necessary for execution of a service application in said wireless sensor node and connection information necessary for connection with said service server,
to provide IPv6 packet transfer function between a MAC layer protocol used in the wireless sensor network and a MAC layer protocol used in the IPv6 network,
to multicast said router solicitation message received from said wireless sensor node into an IPv6 network, and
to transfer said router advertisement message containing prefix information of the IPv6 address in the IPv6 network, received from the IPv6 network in response to said router solicitation message having been multicast, to the wireless sensor node;

wherein said gateway apparatus sets said configuration information acquired from said service server in the router advertisement message upon receipt from the IPv6 network when transferring said router advertisement message to the wireless sensor node; and wherein said wireless sensor node, upon receipt of the router advertisement message transferred from said gateway apparatus, analyzes said router advertisement message to read out the configuration information and provides the configuration information to the service application for execution.

4. The autoconfiguration system for the wireless sensor network according to claim 3, wherein, when said configuration information includes connection information for the service server, such as its IP address, said service application in said wireless sensor node directly communicates with said service server.

5. A gateway apparatus provided in a wireless sensor network which includes a plurality of wireless sensor nodes to connect to an IPv6 network outside the wireless sensor network, said gateway apparatus comprising:

a unit configured:
to receive a router solicitation message containing discrete information of a device or service within the wireless sensor node from the wireless sensor node which has transmitted the router solicitation message in order to set an IPv6 address in the IPv6 network,
to analyze said received router solicitation message to extract the discrete information of a device or service,
to search for a service server, which is located remotely and connected through the IPv6 network, based on said discrete information, and
to acquire from the service server configuration information including information necessary for execution of a service application in said wireless sensor node and connection information necessary for connection with said service server;

a unit configured:
to provide IPv6 packet transfer function between a MAC layer protocol used in the wireless sensor network and a MAC layer protocol used in the IPv6 network,
to multicast said router solicitation message received from said wireless sensor node into an IPv6 network; and a unit configured:
to set the configuration information received from said service server in a router advertisement message upon receipt from the IPv6 network, and
to transfer said router advertisement message to said wireless sensor node, wherein said wireless sensor node, upon receipt of the router advertisement message transferred from said gateway apparatus, analyzes said router advertisement message to read out the configuration information and provides the configuration information to the service application for execution.

* * * * *